July 12, 1960          G. L. HILL          2,944,834
TRACTOR TRAILER DETACHABLE GOOSENECK
Filed Jan. 20, 1958          2 Sheets-Sheet 2
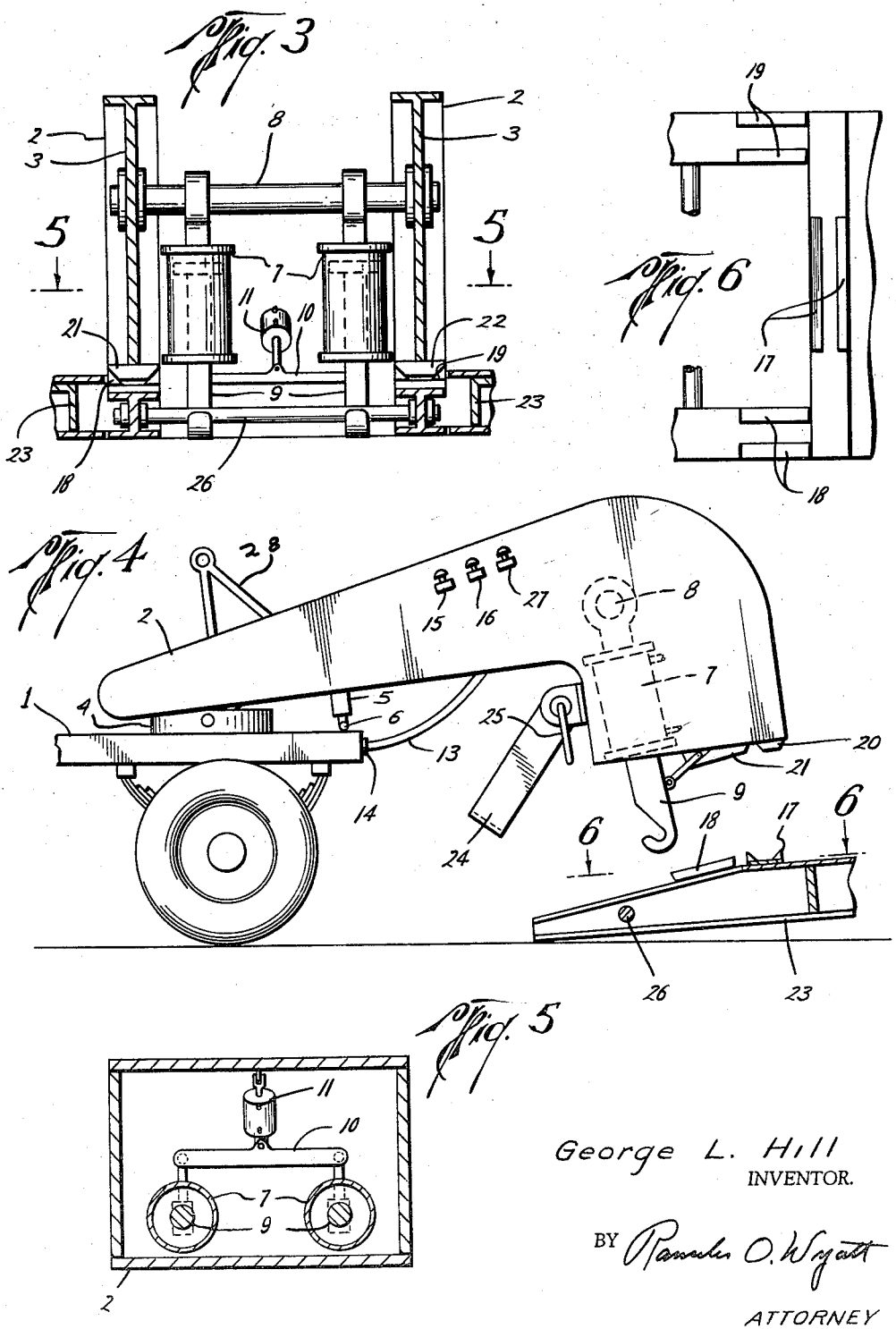
George L. Hill
INVENTOR.
BY *Ramsler O. Wyatt*
ATTORNEY 2,944,834
Patented July 12, 1960

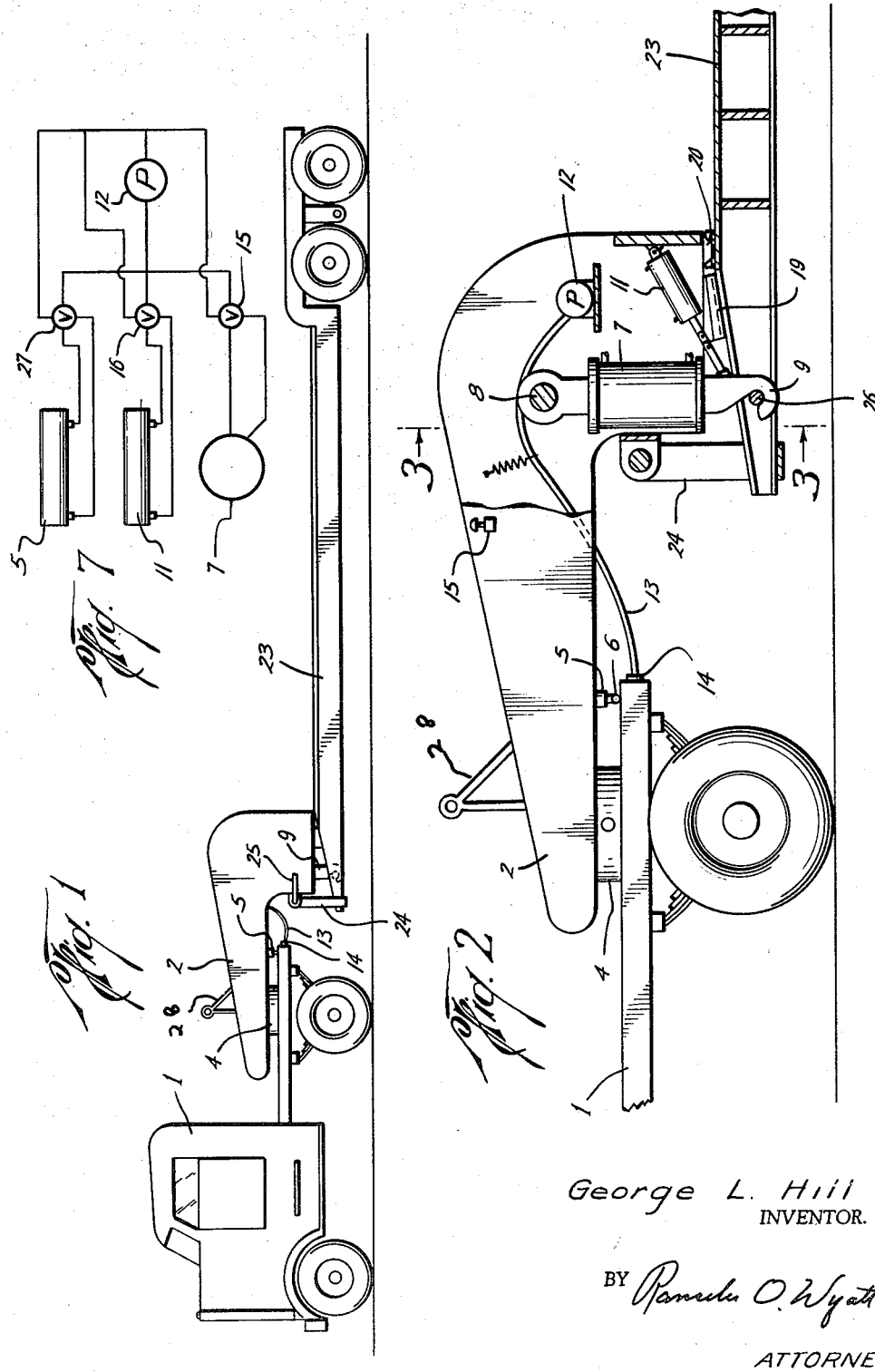

2,944,834
TRACTOR TRAILER DETACHABLE GOOSENECK
George L. Hill, 717 Carby, Houston, Tex.
Filed Jan. 20, 1958, Ser. No. 710,118
5 Claims. (Cl. 280—425)

This invention relates to new and useful improvements in a tractor-trailer.

It is an object of this invention to provide a tractor and trailer such as are used in hauling heavy equipment, having novel means for raising and lowering the connecting neck and the forward end of the trailer to be hauled.

It is another object of the invention to provide a tractor for trailers having novel means for balancing the load on the lifting neck as the forward end of the trailer is lifted.

It is another object of the invention to provide a tractor for trailers having novel means for aligning the lifting neck of the tractor with the trailer as the load is lifted.

It is still a further object of the invention to provide a tracor having novel means for locking the connecting neck and trailer in position after the connection has been completed.

It is another object of the invention to provide means for pivoting the neck of the tractor to establish a connection and pick up the trailer from various positions.

With the above and other objects in view, the invention has relation to certain novel features of construction, operation and arrangement of parts more particularly described in the following specifications and illustrated in the accompanying drawing, wherein:

Figure 1 is a side elevational view of the tractor and trailer in connected relation.

Figure 2 is an enlarged side elevational view, partly in section, showing the tractor and trailer in connected relation.

Figure 3 is an end elevational view, in cross section, taken on the line 3—3 of Figure 2.

Figure 4 is a side elevational view of the tractor neck and the connecting end of the trailer in disconnected relation.

Figure 5 is a top plan view of the lifting mechanism taken on the line 5—5 of Figure 3.

Figure 6 is a top plan view of the aligning means employed, taken on the line 6—6 of Figure 4, and Figure 7 is a diagrammatic view of the hydraulic system employed.

Referring now more particularly to the drawings, the numeral 1 designates a truck tractor having a pivotal neck 2 comprising the eye-beams 3, 3 which are covered with suitable material such as sheet metal and are mounted at one end on the tractor 1 on the pivoting means 4. A hydraulic lift 5 is mounted on the neck 2, and a rotatable bearing 6 is mounted on the lower end of the lift 5. A lifting means is mounted in the extended end of the neck 2 comprising a pair of hydraulic jacks 7, 7 which are pivotally mounted on the supporting bar 8 and from which extend the connecting arms 9, 9 having hooks formed in the extended ends thereof. A connecting bar 10 joins the arms 9, 9 and is secured to the arms 9, 9 by a pivotal connection. The bar 10 is preferably pivotally connected to the hydraulic jack 11.

Mounted in the extended end of the neck 2 is a suitable hydraulic pump 12 which is operated through the flexible cable 13 extending from the power take off 14 on the tractor 1. Controls 15, 16, 27, which are preferably four-way valves, provide selective control to the various hydraulic jacks.

On the forward end of the trailer, channel irons 17, 18 and 19 are provided and on the extended end of the neck 2, inwardly beveled guides 20, 21 and 22 are provided to fit in the channel irons 17, 18 and 19 to align the neck with the trailer.

In the forward end of the trailer 23 is mounted a cross bar 26, the extended ends of the trailer bed providing downwardly sloped tracks on which a vehicle may be moved on to the trailer bed, the area between the tracks on the trailer end being open.

On the downwardly curved end of the neck 2 is pivotally mounted a suitable locking device 24, which is U-shaped forming a yoke having a locking handle 25.

When it is desired to connect the tractor to a trailer, the tractor is moved into position with the downwardly curved portion of the neck over the trailer end to be connected. The neck is lowered through the jack 5 to a level position and the arms 9 are lowered through the jacks 7, 7 and the jack 11 pivots the arms 9, 9 rearwardly until they are in lowered position. In the event the trailer is not level, that is, if one side of the trailer is lower than the other, the first arm to contact the ground surface beneath the trailer will be stopped, and, the hydraulic line from the pump to the jacks 7, 7 being a common line, the pressure will be applied to the jack still remaining out of contact, the bar 10 pivoting to allow misalignment, and when both arms are in contact with the surface beneath the trailer, the jack 11 will be activated to move the arms 9, 9 into connection with the bar 26, and the pressure flow to the jacks 7, 7 reversed, lifting the arms 9, 9 and the common line to the jacks 7, 7 will cause a concentration of pressure on the lowermost jack to equalize the load on the two, and will cause the lowermost arm to lift first and the trailer to be leveled as it is lifted. As the neck 2 is lowered on to the trailer 23, the guides 20, 21, 22 will seat in the channel irons 17, 18 and 19, aligning the neck with the trailer. When the arms 9, 9 are in raised position, the locking device 24 may be swung into locking position around the extended ends of the tracks of the trailer 23 and the handle 25 rotated to lock the locking device in locked position.

When moving the tractor into position to connect to a trailer, the tractor need not be in exact alignment with the trailer, as the neck may be pivoted laterally on the tractor, the bearing 6 on the jack 5 permitting such movement. When it is desired to disconnect the tractor from the trailer, the arms 9, 9 are lowered as above described, and the jack 11 activated to move the arms 9, 9 rearwardly out of connection with the bar 26. The locking device 24 is released by reverses rotation of the handle 25 and the manual movement of the member 24 out of relation with the trailer 23. The arms 9 may then be raised and the jack 5 will elevate the neck 2. An upstanding post as 28 is mounted on the neck 2 over the pivot means 4, which may be used to raise the neck where a winch (not shown) is mounted on the tractor and which may be employed as a boom rest for use when equipment such as drag lines are being hauled. It may be noted that the channel irons 17, 18 are on the same plane as the tracks of the trailer. When the trailer is connected to the neck 2 and a load is being hauled and an obstacle, such as a railroad track, is encountered that leaves the rear wheels of the truck and the front wheels of the trailer lower than the obstacle, and the front end of the trailer can not clear the obstacle, the control to the jacks 7, 7 may be manipulated, raising the arms 9 and raising the front end of the trailer, the channel irons 18, 19 maintaining the trailer in alignment with the neck, the locking device 24 is swung away from the trailer end and the obstacle thus cleared. When the obstacle has been passed, the locking device may be moved back into position and the jacks 7, 7 may be lowered to again align the trailer end into running position. The front end of the trailer may be lowered to permit additional overhead clearance in the same manner, the jacks 7, 7 supporting the load until the obstacle is passed.

While the foregoing is considered a preferred form of the invention, it is by way of illustration only, the broad principle of the invention being defined by the appended claims.

What I claim is:

1. In a tractor-trailer, a tractor having a rearwardly extended pivotally mounted neck, a pair of lifting arms mounted in the extended end of said neck, hydraulic jacks mounted in said neck for moving said arms upwardly and downwardly, a pivot bar mounted in said neck and each end thereof connecting one of said arms and a hydraulic jack mounted in said neck and connected to said pivot bar for moving said arms inwardly and outwardly.

2. In a tractor-trailer, a tractor having a rearwardly extended pivotally mounted neck, a pair of lifting arms mounted in the extended end of said neck, hydraulic jacks in said neck for moving said arms upwardly and downwardly, a pivotally mounted bar in said neck connecting said arms and a hydraulic jack in said neck for moving said arms inwardly and outwardly, guide means on said neck for aligning said neck with the trailer to be connected.

3. In a tractor-trailer, a tractor having a rearwardly extended pivotally mounted neck, a pair of lifting arms mounted in the extended end of said neck, hydraulic jacks mounted in said neck for moving said arms upwardly and downwardly, a pivotally mounted bar in said neck connecting said arms and a hydraulic jack in said neck and connected to said bar for moving said arms inwardly and outwardly, and a pivotally mounted locking yoke on said neck movable into and out of connecting relation with said trailer.

4. In a tractor-trailer, a tractor having a pivotally mounted neck, one end of said neck being extended and downwardly turned, a pair of hydraulic jacks pivotally mounted in said neck and having downwardly extending connecting arms movable vertically, a hydraulic pump mounted in said neck and a common hydraulic line leading from said pump to said jacks, a pivotally mounted connecting bar on said arms and a hydraulic jack pivotally mounted on said neck and a pivotally mounted connection with said connecting bar and jack, aligning means on said neck and trailer, a hydraulic jack on said neck in position to be moved into contact with said tractor to raise or lower said neck and a bearing on the extended end of said last mentioned jack.

5. In a tractor-trailer, a tractor having a pivotally mounted neck, one end of said neck being extended and downwardly turned, a pair of hydraulic jacks pivotally mounted in said neck and having downwardly extending connecting arms movable vertically, a hydraulic pump mounted in said neck and a common hydraulic line leading from said pump to said jacks, a pivotally mounted connecting bar on said arms and a hydraulic jack pivotally mounted on said neck and a pivotal connection with said connecting bar, aligning means on said neck and trailer, a hydraulic jack on said neck in position to be moved into contact with said tractor to raise or lower said neck and a bearing on the extended end of said last mentioned jack, means in operative connection with the power take off on said tractor for operation of said pump, and control means for directing hydraulic pressure from said pump to the various jacks employed.

References Cited in the file of this patent

UNITED STATES PATENTS

| | | |
|---|---|---|
| 2,545,584 | Meadows | Mar. 20, 1951 |
| 2,667,282 | Parker | Jan. 26, 1954 |
| 2,822,945 | Duffy | Feb. 11, 1958 |